US008113931B2

(12) United States Patent
Ishii

(10) Patent No.: US 8,113,931 B2
(45) Date of Patent: Feb. 14, 2012

(54) VIDEO GAME PROCESSING APPARATUS, VIDEO GAME PROCESSING METHOD AND VIDEO GAME PROCESSING PROGRAM

(75) Inventor: Koichi Ishii, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1293 days.

(21) Appl. No.: 11/624,999

(22) Filed: Jan. 19, 2007

(65) Prior Publication Data

US 2007/0225073 A1  Sep. 27, 2007

(30) Foreign Application Priority Data

Mar. 1, 2006  (JP) .................................. 2006-054459

(51) Int. Cl.
*A63F 9/24* (2006.01)
*A63F 13/00* (2006.01)
(52) U.S. Cl. ..................... 463/9; 463/1; 463/30; 463/31
(58) Field of Classification Search .................. 463/1, 9, 463/30, 31
See application file for complete search history.

(56) References Cited

U.S. PATENT DOCUMENTS 6,656,051 B2  12/2003  Ishii et al.
2003/0092492 A1  5/2003  Ishii et al.

FOREIGN PATENT DOCUMENTS

JP  2004-000354  1/2004

OTHER PUBLICATIONS

Capcom vs. SNK 2 EO game manual (released for Xbox on Feb. 11, 2003), pp. 1-21.*
Super Mario Kart Instruction Booklet (released for SNES on Sep. 1, 1992), pp. 1-34.*
SNK vs Capcom game manual (released for Xbox Oct. 7, 2004), pp. 1-32.*
"Weekly Famitsu", vol. 21, No. 10, Enterbrain, Inc., Mar. 17, 2006, p. 292, together with a partial English language translation.
"Nintendo Dream", vol. 144, No. 4, Mainichi Communications, Inc., Apr. 1, 2006, pp. 19 and 21, together with a partial English language translation.
"Nintendo Dream", vol. 143, No. 3, Mainichi Communications, Inc., Mar. 1, 2006, pp. 20-23, together with a partial English language translation.
U.S. Appl. No. 11/678,890, filed Feb. 26, 2007, Ishii.
English language Abstract of JP 2004-000354.
Dengeki Game Cube, (Game Boy Advance, PawaPokeDasshu), Media Works, Feb. 23, 2006, vol. 6, No. 7, pp. 74-77, and an English language partial translation thereof.

* cited by examiner

*Primary Examiner* — Peter DungBa Vo
*Assistant Examiner* — Jasson Yoo
(74) *Attorney, Agent, or Firm* — Greenblum & Bernstein, P.L.C.

(57) ABSTRACT

A controller executes a special effect selection representation using a slot representation representing a slot machine when a fever accumulative value, which is accumulated by a player character doing damage to an enemy character, reaches a predetermined value, and a fever gauge becomes filled up, in accordance with a player's operation. The controller assigns a special effect to the player character in accordance with a result of the representation. Then, when the fever accumulative value is sequentially subtracted and reduced to an initial value, the assignment of the special effect to the player character is finished. Thus, the special effect to be assigned to the player character when predetermined selection allowance conditions are fulfilled is prevented from being specified in advance by the player, and increase the player's interest in a game.

29 Claims, 6 Drawing Sheets

VIDEO GAME PROCESSING APPARATUS, VIDEO GAME PROCESSING METHOD AND VIDEO GAME PROCESSING PROGRAM

CROSS REFERENCE TO RELATED APPLICATION

The present disclosure relates to subject matter contained in Japanese Patent Application No. 2006-054459, filed on Mar. 1, 2006, the disclosure of which is expressly incorporated herein by reference in its entirety.

BACKGROUND OF THE INVENTION

1. Field of the Invention

The present invention relates to a technique for controlling a progress of a game by displaying a player character on a display screen of a display device and controlling an action of the player character displayed on the display screen in accordance with a player's operation.

2. Description of the Related Art

Conventionally, various kinds of so-called role playing games (RPG; that is, a game in which a player plays a role of a character in a game world and, achieves a predetermined object while enjoying a process that the character grows through various experiences) have been proposed.

In the RPG, generally, a player character acting in accordance with a player's operation wins a battle against an enemy character, impeding the achievement of the predetermined object, and thereby the player gains various benefits such as an experiential value.

In not only the RPG, but also other types of video games, some kinds of benefits are given to the player character when predetermined conditions are fulfilled. For example, there is a video game in which the number of predetermined characters is increased or a player character becomes in an invincible state. Also, Japanese Unexamined Patent Publication No. 2004-000354, for example, discloses a video game in which, in a battle scene against an enemy character, points accumulate on a gauge, and the like, each time an attack by a player character hits the enemy character, and some kinds of benefits, such as an ability for using a special technique, is given to the player character when the points reach a fixed level.

However, in the video game described in Japanese Unexamined Patent Publication No. 2004-000354, because the benefits which the player character is given are oversimplified, and the player can previously know what kinds of benefits are given, a player may lose his/her interests in the game.

SUMMARY OF THE INVENTION

It is an object of the present invention to solve the problems described above and to prevent a special effect to be given to a player character from being specified in advance by a player when predetermined conditions are fulfilled, and thereby to increase a player's interest in a game.

According to a first aspect of the invention, there is provided a video game processing apparatus (for example, a video game apparatus 100, a video game apparatus main body 10 as shown in FIG. 1) that causes an image display apparatus to display a player character of a video game on an image screen of the image display apparatus. The video game processing apparatus controls progress of the video game by controlling an action of the player character displayed on the image screen in accordance with operations by a player. The apparatus includes a special effect selection representation unit that executes a special effect selection representation for selecting any one of a predetermined plurality of kinds of special effects in a drawing based on an establishment of predetermined selection allowance conditions. The apparatus further includes a special effect assigning unit that assigns to the player character the special effect selected in the special effect selection representation.

With such a configuration, it is possible to prevent a special effect to be assigned to the player character when the predetermined selection allowance conditions are fulfilled from being specified in advance by the player, enabling the player's interest in the game to be increased.

The video game processing apparatus may further include a special effect assignment determiner that determines whether to assign the special effect to the player character when the predetermined selection allowance conditions are established. In the apparatus, the special effect selection representation executing unit executes the special effect selection representation when the special effect assignment determiner determines to assign the special effect.

The video game processing apparatus may further include a special effect non-assignment representation executing unit that executes a special effect non-assignment representation for notifying that none of the predetermined plurality of kinds of special effects is assigned. In the apparatus, the special effect non-assignment representation executing unit executes the special effect non-assignment representation when the special effect assignment determiner determines not to assign the special effect.

With such a configuration, it is possible to carry out the special effect non-assignment representation when no special effect is assigned. Particularly, by carrying out a special effect non-assignment representation similar to the special effect selection representation, it is possible to cause the player to have hopes, thereby enabling a further increase in the player's enjoyment of the game.

The video game processing apparatus may further include an action value accumulating unit that accumulates action values according to a predetermined action relating to the player character. In the apparatus, the selection allowance conditions are established when the action values accumulated by the action value accumulating unit reaches the predetermined value.

With such a configuration, it is possible to cause the player to operate the player character with a purpose of accumulating the action value, enabling a further increase in the player's enjoyment of the game.

In the video game processing apparatus, the action value accumulating unit may accumulate the action values in accordance with a number of hits from attacks made for an enemy character by the player character or damage done to the enemy character by the attacks made by the player character. Also, the action value accumulating unit may accumulate the action values in accordance with a number of hits from attacks made on the player character by the enemy character or damage done to the player character by the attacks made by the enemy character.

The video game processing apparatus may further include an action value subtracting unit that temporally subtracts the action values accumulated by the action value accumulating unit from a timing at which the special effect assigning unit assigns a special effect to the player character. In the apparatus, the special effect assigned to the player character may remain effective until a fixed period of time elapses until the action value is reduced to an initial value by the subtraction of the action value subtracting unit.

With such a configuration, it is possible to cause the player to recognize a remaining time for which the special effect continues.

The video game processing apparatus may include a special effect assignment request receiver that receives a request for a special effect assignment to the player character after the predetermined selection allowance conditions are established. In the apparatus, the special effect selection representation executing unit may execute the special effect selection representation when the special effect assignment request receiver receives the request for the special effect assignment.

With such a configuration, it is possible for the player to specify a timing for executing the special effect selection representation, enabling a further increase in the player's enjoyment of the game.

The special effect selection representation may include, for example, a slot representation representing a slot machine, or a roulette representation representing a roulette game.

The special effect may be, for example, a merit for increasing an action ability of the player character or a demerit for reducing the action ability of the player character.

According to a second aspect, there is provided a video game processing method for causing an image display apparatus to display a player character of a video game on an image screen of the image display apparatus. The method controls progress of the video game by controlling an action of the player character displayed on the image screen in accordance with operations by a player. The method includes executing a special effect selection representation for selecting any one of a predetermined plurality of kinds of special effects in a drawing based on an establishment of predetermined selection allowance conditions. The method further includes assigning to the player character the special effect selected in the special effect selection representation.

According to a third aspect of the invention, there is provided a computer program product for processing a video game. The progress of the video game is controlled by causing an image display apparatus to display a player character of a video game on an image screen of the image display apparatus, and controlling an action of the player character displayed on the image screen in accordance with operations by a player. The computer program product causes a computer to execute a special effect selection representation for selecting any one of a predetermined plurality of kinds of special effects in a drawing based on an establishment of predetermined selection allowance conditions. The computer program product further causes a computer to assign to the player character the special effect selected in the special effect selection representation.

According to the invention, it is possible to prevent a special effect, which is to be assigned to the player character when the predetermined selection allowance conditions are fulfilled, from being specified in advance by the player, enabling the player's interest in the game to be increased.

DESCRIPTION OF THE PREFERRED EMBODIMENTS

Hereafter, a description will be given of an embodiment of the invention with reference to the appended drawings.

Figure 1:
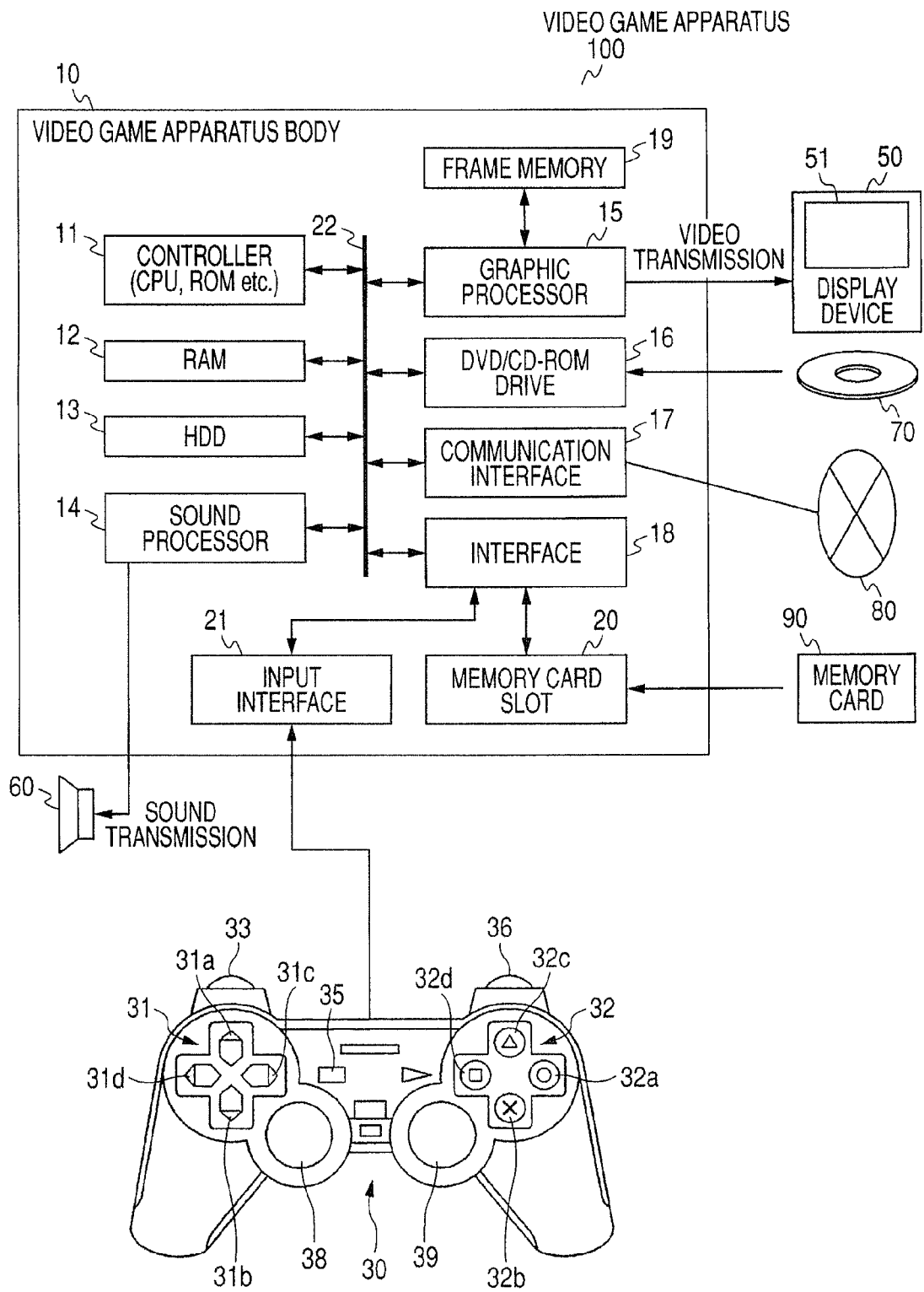
FIG. 1 is a block diagram showing an example of a configuration of a video game apparatus according to an embodiment of the invention.

FIG. 1 is a block diagram showing an example of a configuration of a video game apparatus 100 according to the embodiment.

As shown in FIG. 1, the video game apparatus 100 of this embodiment includes a video game apparatus main body 10, a display device 50 and a sound output device 60. The video game apparatus main body 10 is constituted from, for example, a commercial video game machine. Also, the display device 50 is constituted from, for example, a television apparatus, a liquid crystal display device and the like, and includes an image display screen 51.

The video game apparatus main body 10 includes a controller 11, a RAM 12, a hard disk drive (HDD) 13, a sound processor 14, a graphics processor 15, a DVD/CD-ROM drive 16, a communications interface section 17, an interface 18, a frame memory 19, a memory card slot 20 and an input interface section 21.

Each of the controller 11, RAM 12, hard disk drive (HDD) 13, sound processor 14, graphics processor 15, DVD/CD-ROM drive 16, communications interface section 17 and interface section 18 is connected to an internal bus 22.

The controller 11 includes a CPU, ROM and the like, and carries out control of the whole of the video game apparatus 100 in accordance with one or more control programs stored in the HDD 13 or a storage medium 70. The controller 11 includes an internal timer used to generate timer interruption. The RAM 12 is used as a work area of the controller 11. The HDD 13 is a storage area for storing the control programs and various data.

The sound processor 14 is connected to the sound output device 60, which includes, for example, a speaker. The sound processor 14 outputs sound signals to the sound output device 60 in accordance with a sound output command from the controller 11 executing a process in accordance with the one or more control programs. The sound output device 60 may be embedded in the display device 50, or the video game apparatus main body 10.

The graphics processor 15 is connected to the display device 50, including the image display screen 51, on which an image is displayed. The graphics processor 15 develops an image on the frame memory 19 in accordance with a drawing command from the controller 11, and outputs video signals for displaying the image on the image display screen 51 to the display device 50. A switching time for images to be displayed based on the video signal is set to, for example, 1/30 seconds per frame.

The storage medium 70, such as, for example, a DVD-ROM medium and a CD-ROM medium in which a control program for a game is stored, is mounted in the DVD/CD-ROM drive 16. The DVD/CD-ROM drive 16 carries out a process for reading various data such as the control program from the storage medium 70.

The communications interface 17 is connected to a communication network 80 such as the Internet, for example, in a wired or wireless manner. The video game apparatus main body 10, carries out communications with, for example, another computer via the communication network 80 using a communication function of the communications interface 17.

Both the input interface section 21 and the memory card slot 20 are connected to the interface 18. The interface section 18 stores instruction data from the input interface section 21 in the RAM 12, based on operation of a keypad 30 by a player. Then, in accordance with the instruction data stored in the RAM 12, the controller 11 executes various arithmetic processes.

The video game apparatus main body 10 is connected via the input interface section 21 to the keypad 30, which serves as an operation input unit (a controller).

A cross key 31, a group of buttons 32, a left joystick 38 and a right joystick 39 are arranged on the upper surface of the keypad 30. The cross key 31 includes an up key 31*a*, a down key 31*b*, a right key 31*c* and a left key 31*d*, and the group of buttons 32 includes a circle button 32*a*, an X button 32*b*, a triangle button 32*c* and a square button 32*d*. Also, a select button 35 is arranged at a connecting portion between a base on which the cross key 31 is arranged and a base on which the group of buttons 32 is arranged. Multiple buttons, such as an R1 button 36 and an L1 button 33, are also arranged on the side surface of the keypad 30.

The keypad 30 is provided with switches respectively connected to the cross key 31, the circle button 32*a*, the X button 32*b*, the triangle button 32*c*, the square button 32*d*, the select button 35, the R1 button 36, the L1 button 33 and the like. When a pressure is applied to each button, the corresponding switch is turned on. A detection signal corresponding to a turning on/off of the switch is generated in the keypad 30, and a detection signal corresponding to a tilt direction of the left joystick 38 and the right joystick 39 is also generated in the keypad 30.

The two types of detection signals generated in the keypad 30 are supplied to the input interface 21, and the detection signals from the keypad 30 are caused to pass through the input interface 21, by which detection information indicating which button on the keypad 30 is turned on and detection information indicating the state of each of the left joystick 38 and the right joystick 39 are generated. In this way, operation commands to the keypad 30 by a player is given to the video game apparatus main body 10.

Also, the interface section 18, in accordance with the commands from the controller 11, carries out a process to store data during a game progress, which is stored in the RAM 12, in a memory card 90 installed in the memory card slot 20. The interface section also carries out a process to read data of the game at the time of suspending the game, which data are stored in the memory card 90, and to transfer such data to the RAM 12, and the like.

Various data, such as the control program for playing the game with the video game apparatus 100, are stored in, for example, the storage medium 70. Various data, such as the control program stored in the storage medium 70, are read by the DVD/CD-ROM drive 16 having the storage medium 70 installed therein, and are loaded into the RAM 12. The controller 11, in accordance with the control program loaded into the RAM 12, executes various processes, such as a process to output the drawing command to the graphics processor 15 and a process to output a sound outputting command to the sound processor 14. While the controller 11 executes the processes, intermediate data generated based on the game process (such as, for example, data indicating a game score, the state of a player character and the like) are stored in the RAM 12 used as a work memory.

It is assumed that the three-dimensional video game according to this embodiment is a game in which the game proceeds as multiple characters, including a player character (that is, a character which acts in accordance with the operation of the keypad 30 by the player) move on a field provided in a virtual three-dimensional space. It is assumed that the virtual three-dimensional space in which the field is formed is indicated by a world coordinate system. The field is configured of multiple surfaces, and vertex coordinates of the respective constituent surfaces are represented as feature points.

Next, a description will be given of an operation of the video game apparatus 100 according to the present embodiment.

Herein, in order to simplify the explanation, it is assumed that only a single player character and multiple non-player characters (NPC: characters acting in accordance with a control by the game machine apparatus 100 (specifically, control by the controller 11)) exist as objects acting in the virtual three-dimensional space, and the description of any process other than processes particularly relating to the invention may be omitted. In this embodiment, a video game control for an RPG is executed.

Figure 2:
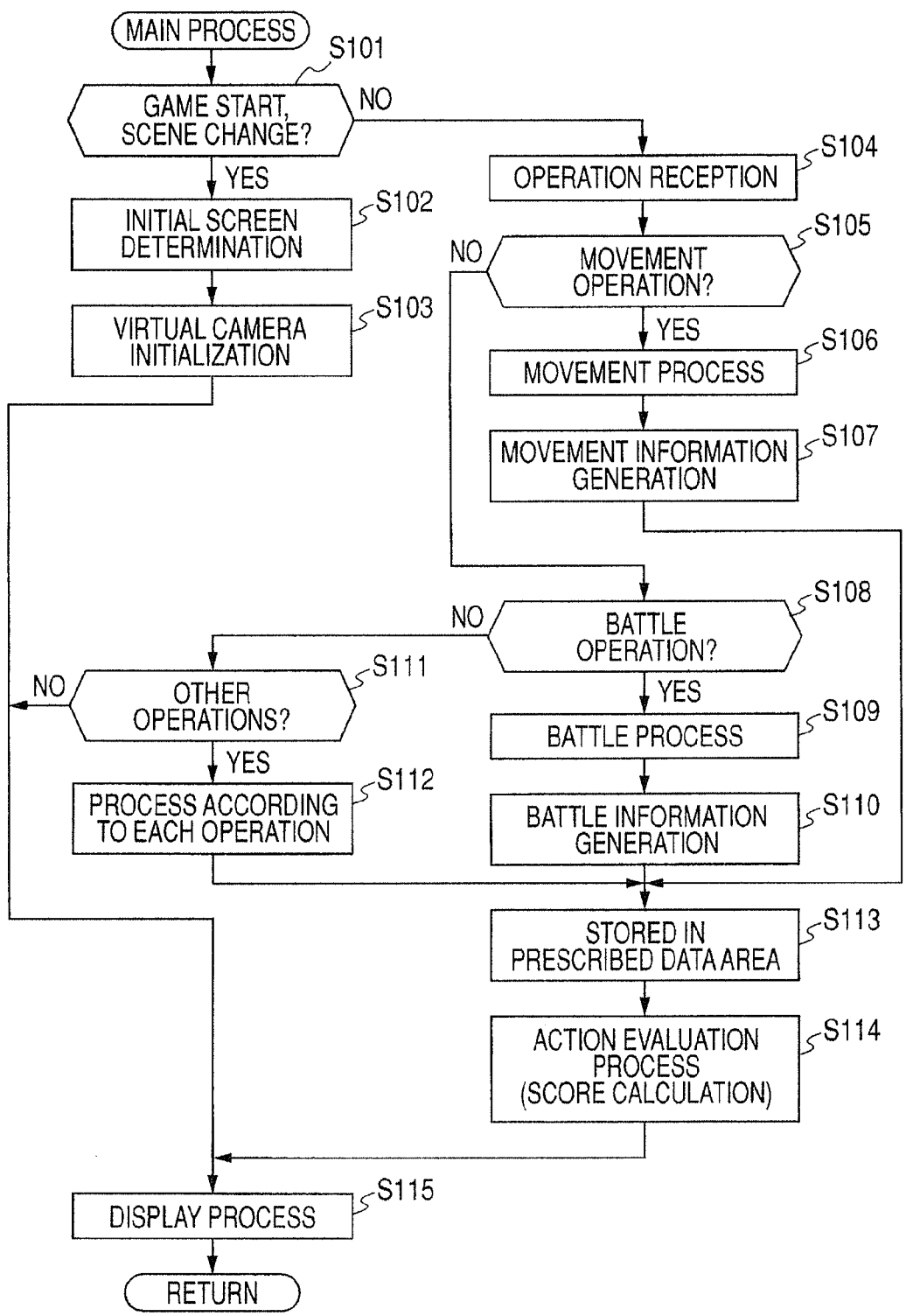
FIG. 2 is a flowchart showing an example of a main process.

FIG. 2 is a flowchart showing an example of a main process in the video game apparatus 100 according to this embodiment. The main process is a process for generating an image for one frame and a process necessary for the video game control. The main process is executed in accordance with timer interruption at every $1/30$ second. "Every $1/30$ second" is an example, and the main process may be executed in accordance with timer interruption at every field period (every $1/60$ second), or at every two frame periods (every $1/15$ second) depending on a processing amount.

In the present embodiment, the game progresses in a common field in which various actions, including a movement of the player character and a battle by the player character, are allowed. When a predetermined object in the field is achieved, a stage in the field is terminated and the processing proceeds to another stage in a next field. Also, in the present embodiment, a same time basis is applied to each character appearing on a field; and, once the character appears, unless a hit point (HP; that is, a value representing a vital energy) is reduced to 0, it moves and stands still in the field in accordance with the same time base. A portion displayed on the image display screen 51, as a character image, exists within a field of view of a virtual camera in the field.

In the main process, if the game has not been started, the controller 11 determines whether a game start instruction has been generated by a player's operation of the keypad 30. Alternatively, if the game is being executed, the controller 11 determines whether a time has come to change the scene (for example, a change of the field) (step S101). The "time to carry change the scene" refers to, for example, a time to finish a scene (for example, a scene displayed by the virtual three-dimensional space, and a scene displayed by an animation effect using a moving image) displayed on the image display screen 51, to display a virtual three-dimensional space showing the new scene on the image display 51.

If the controller 11 determines that the game start instruction has been given, or that the time has come to carry out the scene change (Yes in step S101), it determines an initial screen (an initial screen at the time of the game start, or an initial screen at the time of the scene change) in accordance with the control program (step S102). Various data, such as image data used for the game and characters, are stored in the storage medium 70. In step S102, an initial display position of the player character in the initial screen or a scene after a scene change (such as, for example, a new stage), an NPC to be displayed and its initial display position, and the like, are determined in accordance with the control program.

Next, the controller 11 determines a viewpoint position, a visual axis direction and a visual angle size of the virtual camera in accordance with the control program, and carries out an initialization of the virtual camera for carrying out a perspective transformation (step S103). Then, the processing proceeds to step S115.

If the controller 11 determines that the game is being executed, and that the time has not come to carry out the scene change (No in step S101), it receives instruction data based on a player's operation of the keypad 30 (step S104). That is, the controller 11 determines whether instruction data for causing an action, or the like, of the player character to be executed have been input from the keypad 30. If effective instruction data (meaning instruction data of which a reception is allowed) have been input, the controller 11 receives the instruction data.

If the controller 11 receives instruction data for instructing the action of the player character relating to the movement (such as, for example, movement instruction data: a movement command and a movement instruction by a direction instruction key) at step S104 (Yes in step S105), the controller 11 executes a movement process in accordance with the received movement instruction data (step S106). In the movement process, the controller 11 moves a position of the player character in a virtual space (on a current field) in accordance with the received movement instruction data. The movement command may include, for example, a dash instruction command and the like. The dash instruction command is a command for causing the player character to move quickly and, in the event that the player character is in the middle of a battle, a command for giving an instruction to move away (run away) quickly from a battle area.

Next, the controller 11 generates movement information, based on position information of the player character derived along with the movement process (step S107). That is, in accordance with a movement of the position of the player character by the movement process, the controller 11 updates necessary data among data on the viewpoint position, data on visual axis direction and data on visual angle size of the virtual camera, and changes setting content of the virtual camera. The movement information includes various kinds of information relating to the movement, such as, for example, the moved position of the player character, and the viewpoint position, visual axis direction, visual angle size and the like of the virtual camera changed by the movement of the player character. Then, the processing proceeds to step S113.

If, in step S104, the controller 11, in accordance with an operation of the keypad 30 for instructing an action of the player character relating to the battle (a battle operation) (No in step S105), receives instruction data for instructing the action relating to the battle (such as, for example, battle instruction data: a battle command) (Yes in step S108), the controller 11 executes a battle process in accordance with the received battle instruction data (step S109). In the battle process, the controller 11 executes, for example, a process for determining a result and a progression of a battle between the player character and an enemy character acting as its opponent, and the like.

Next, the controller 11 generates battle information based on the battle result and progression determined by the battle process (step S110). That is, in accordance with the battle result and progression determined by the battle process, the controller 11 updates and sets necessary information among the names of the player character and the enemy character, which the player battles, a battle progression, a battle result, a parameter defining an ability of the player character, and the like. The battle information includes a variety of information related to the battle, such as, for example, the names of the player character and the enemy character which have fought with each other, the battle progression, the battle, and the parameter defining the ability of the player character. Then, the processing proceeds to step S113.

When, the controller 11 receives instruction data for the other instructions (that is, other instruction data, such as, for example other commands, which may include a conversation, shopping, discarding or picking up items, and the like) in accordance with operations of the keypad 30 for executing the other instructions (other operations) in step S104 (Yes in step S111), the controller 11 executes processes corresponding to the other instruction data received (for example, a conversation, shopping, discarding/gaining items, and the like) (step S112). Then, the controller 11 generates other various kinds of information corresponding to process results of step S112. Then, the processing proceeds to step S113.

In step S113, the controller 11 updates the current position of the player character by storing the movement information generated in step S107 in a predetermined data area of the RAM 12. Also, in step S113, the controller 11 stores and retains various action histories of the player character by storing the battle information generated in step S110 and the other various information generated after step S112 in predetermined data areas of the RAM 12.

Next, the controller 11 executes an action evaluation process based on the action histories temporarily stored in the RAM 12 (step S114). Specifically, information required to be digitalized is digitalized using a conversion table prepared in advance, and with respect to information required to be weighted, a score is calculated by multiplying predetermined numerical values and summing the multiplied numerical values. Then, by adding the calculated score to an old score stored in a predetermined data area of the RAM 12, and storing the sum in the predetermined area again, a score provided as evaluation information is updated.

Then, the controller 11 perspectively transforms the virtual three-dimensional space, including the player character and non-player characters, to be displayed from the virtual camera onto a virtual screen in accordance with the setting contents of the virtual camera. Then, the controller 11 carries out a display process for generating a two-dimensional image to be displayed on the image display screen 51 (step S115). When the display process is finished, the current main process is also finished. Subsequently, when a timer interruption occurs at a start timing of the next frame period, a next main process is executed. Then, by repeatedly executing the main process, the character image is switched every frame period, and an animation is displayed on the image display screen 51.

At this point, a brief description will be given of the display process in step S115. In step S115, the controller 11 converts at least vertex coordinates of a polygon included in a range to be perspectively transformed onto the virtual screen, among vertex coordinates of polygons configuring the three-dimensional space including the player character and the non-player characters, from coordinates of the world coordinate system into coordinates of the viewpoint coordinate system. Subsequently, the controller 11 transmits the vertex coordinates of polygons of the player character and the non-player characters in the viewpoint coordinate system to the graphic processor 15, and thereby outputting a drawing command to the graphics processor 15.

On receiving the drawing command, the graphic processor 15, based on the coordinates of the viewpoint coordinate system, updates contents of a Z buffer so that data on the points at the front side are retained with respect to individual points constituting each surface. When the graphic processor 15 updates the contents of the Z buffer, it develops image data on the remaining points at the front side on the frame memory 19. Also, the graphic processor 15 carries out processes, such as, for example, a shading process and a texture mapping process, with respect to the image data to be expanded.

Then, the graphic processor 15 sequentially reads the image data expanded on the frame memory 19, and generates a video signal by adding a synchronization signal to output the video signal to the display device 50. The display device 50 displays an image corresponding to the video signal output from the graphic processor 15 on the image display 51. By switching the images on the image display 51 every frame time, the player can see the image including the state in which the player character and the non-player characters move on a field.

Next, a description will be given of an example of a three-dimensional field screen to be displayed on the image display screen 51 of the display device 50 in the video game of the example.

Figure 3:
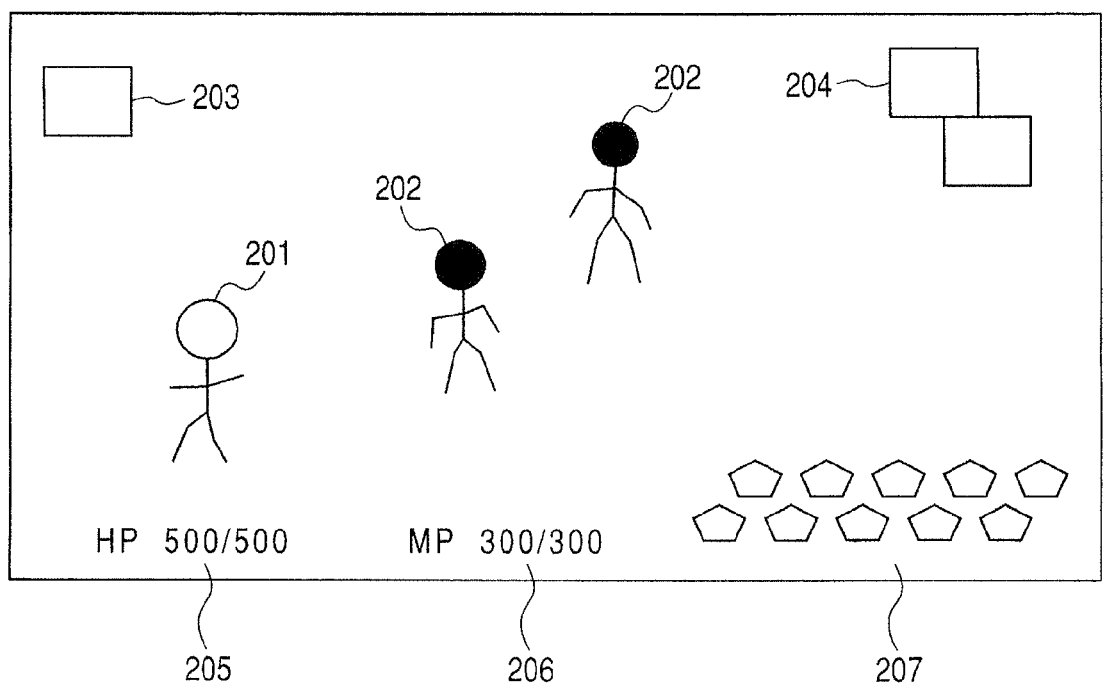
FIG. 3 is an explanatory view showing an example of a three-dimensional field screen.

FIG. 3 is an illustration showing an example of the three-dimensional field screen. As shown in FIG. 3, characters such as, for example, a player character 201 and multiple enemy characters 202 thwarting a predetermined object of the player character, are displayed on the three-dimensional field screen. In the present embodiment, the three-dimensional field screen provides an image of a field viewed down from a vantage point somewhat above the field. Also, the three-dimensional field display screen displays, besides the characters, an item display area 203 in which is displayed an item that the player character 201 can currently use, and a weapon display area 204 in which is displayed a weapon the player character 201 is currently equipped with (for example, it can be equipped with two weapons). Further, the three-dimensional field display screen displays an HP display area 205 in which are displayed a maximum value of hit points (HP) of the player character 201 and a current HP value, an MP display area 206 in which are displayed a maximum value of magic points (MP) of the player character 201 and a current MP value. Furthermore, the three-dimensional field display screen displays a fever gauge 207 on which is displayed an accumulative value of fever values to be described hereafter. In this embodiment, it is possible to place the player character 201 in a fever state by filling up the fever gauge 207.

The "fever value" refers to an accumulative value of values acquired in case where the player character 201 attacks the enemy character 202 or the player character 201 is attacked by the enemy character 202. The "fever state" refers to a state in which the player character 201 is provided with a special effect ready to be exercised when the fever value reaches a predetermined value and the fever gauge 207 becomes filled up. The "case where the player character 201 is attacked by the enemy character 202" refers to a case where the HP of the player character 201 is reduced due to an attack by the enemy character 202. The "case where the player character 201 attacks the enemy character 202" is a case where the HP of the enemy character 202 is reduced due to an attack by the player character 201.

In this embodiment, when the fever value reaches the predetermined value and the fever gauge 207 becomes filled up, it is possible to place the player character 201 in the fever state if the player wants a transition to the fever state. That is, in this embodiment, even when the fever value reaches the predetermined value and the fever gauge 207 becomes filled up, the player character 201 is not immediately placed in the fever state.

Next, a description will be given of an example of a fever value calculation method.

In this embodiment, a fever value acquired by a battle against an enemy character may include a value determined by damage given to the enemy character. For example, a fever value of 100 is obtained when "100 damage" has been given to the enemy character. Otherwise, the damage value of 100 may be multiplied by a predetermined factor such as 0.1 to obtain the fever value of 10. The fever value may also be determined by a number of hit attacks among attacks made by the player character to the enemy character.

Also, in this embodiment, the fever value acquired in the battle against the enemy character also may include a value determined by damage given to the player character from the enemy character. For example, a fever value of 100 is obtained when the "100 damage" is given to the player character from the enemy character. Otherwise, the damage value may be multiplied by a predetermined factor such as 0.1, and a fever value of 100×0.1=10 may be obtained. Alternatively, the fever value may be determined by a number of hit attacks among the attacks which the player character has suffered from the enemy character.

The fever value may be determined based upon either only the damage given to the enemy character or only the damage given to the player character from the enemy character.

Generally, in the RPG, as the game progresses, the maximum HP value of the player character increases, by which an attack ability of the player character increases. In the same way, as the game progresses, a maximum HP value and an attack ability of the enemy character also increase. That is, in case where the fever value is determined based on the damage degree, the fever gauge 207 may be filled up in the short term as the RPG proceeds toward its second half. This means that that there is a possibility that the player may lack enjoyment of the game. For this, the value of the factor may be decreased as the RPG progresses to maintain a balance in the fever value. Also, the value of the factor may be set higher in the case where the player character gives damages to the enemy character than in the case where the player character is damaged by the enemy character.

Also, the fever value may be calculated with the following as factors, apart from the damage which the player character gives to the enemy character, damage which the player character suffers from the enemy character, the number of the hit attacks which the player character makes against the enemy character, and the number of hit attacks which the player character has suffered from the enemy character, the mechanism used for doing damage to the enemy character (such as, for example, a sword or magic), a type of the enemy characters to which damages are given, and a level (such as, for example, a set strength) of the player character, and the like.

Figure 4:
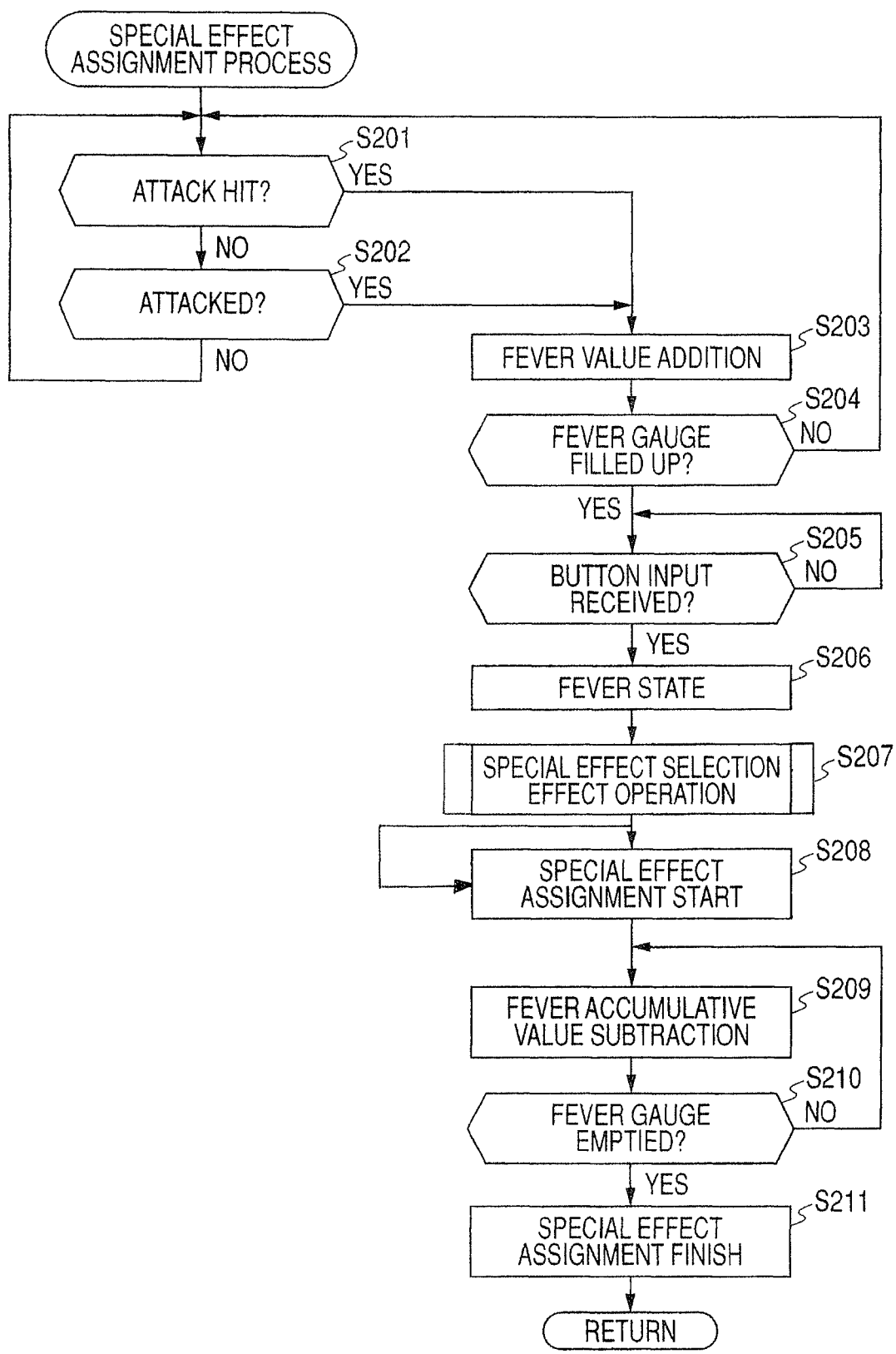
FIG. 4 is a flowchart showing a special effect assignment process.

Next, a description will be given of a special effect assignment process in the video game apparatus 100 of this embodiment. FIG. 4 is a flowchart showing an example of the special effect assignment process in the video game apparatus 100 of this embodiment. The special effect assignment process includes processes relating to a special effect assignment to the player character. The special effect assignment process is activated by repeatedly executing the main process.

In the special effect assignment process, the controller 11 determines whether an attack by the player character has hit the enemy character (step S201). If the controller 11 determines that the attack by the player character has hit the enemy character (Yes in step S201), the controller 11 determines the fever value based on the attack, and adds the determined fever value to a fever accumulative value (step S203). The fever accumulative value is a total sum of the fever values.

Also, the controller 11 determines whether the player character had been attacked by an enemy character (step S202; No in step S201). If the controller 11 determines that the player character has been attacked by the enemy character (Yes in step S202), it determines the fever value based on the attack, and adds the determined fever value to the accumulative value (step S203). If the controller 11 determines that the player character has not been attacked by the enemy character (No in step S203), the special effect assignment process returns to step S201.

Figure 5A:
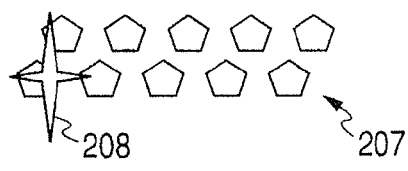
FIGS. 5A to 5I are views showing a transition of a fever gauge including a special effect selection presentation.

If the controller 11 determines in step S201 that the attack has hit the enemy character (Yes in step S201), or if it determines in step S202 that the player character has been attacked by the enemy character (Yes in step S202), for example, as shown in FIG. 5A, the controller 11 carries out a fever value acquisition notification display 208 indicating that the fever value has been obtained. As shown in FIG. 5A, the fever value acquisition notification display 208 is a display in which, herein, a predetermined position glows in the fever gauge 207.

Figure 5B:
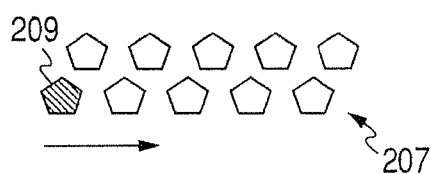

Then, when the fever value is added in step S203, the controller 11 increases a scale of the fever gauge 207 in accordance with an increment of the fever accumulative value. Specifically, in case where the fever value is added in step S203 and the fever accumulative value reaches 1/10 of a maximum fever value (for example, a value when the fever gauge 207 is filled up), for example, a predetermined color is given to one gauge 209 of ten gauges configuring the fever gauge 207, as shown in FIG. 5B. In this embodiment, when all of the ten gauges are colored, it means that the fever gauge 207 is filled up.

When the fever value is added to the fever accumulative value (step S203), the controller 11 determines whether the fever accumulative value has reached a predetermined maximum value (step S204). If the fever accumulative value has not reached the predetermined maximum value (No in step S204), the processing returns to step S201. If the fever accumulative value has reached the predetermined maximum value (Yes in step S204), the controller 11 proceeds to step S205 and goes into a waiting state in which it waits for an activation of a predetermined button by a player's operation of the keypad 30 (No in step S205).

On receiving an instruction signal based on the activation of the predetermined button (for example, the select button 35) by the player's operation of the keypad 30 (Yes in step S205), the controller 11 places the player character in a predetermined fever state (step S206).

Figure 5C:
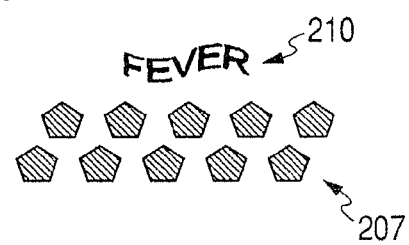

That is, when the fever accumulative value has reached the predetermined maximum value and the fever gauge 207 is filled up (when all the gauges in the fever gauge 207 are colored), if the predetermined button is activated by the player's operation to the keypad 30, as shown in FIG. 5C, the controller 11 displays "FEVER" 210 above the fever gauge 207, by which the player character becomes in the predetermined fever state.

In this embodiment, when the player character is placed in the "fever state", this player character can cancel an attack action rigidity time. In addition, if the player character is equipped with two weapons, the player may execute continuous attacks by combining the two weapons. Also, the player character may use a deadly technique extensively and quickly.

Figure 6:
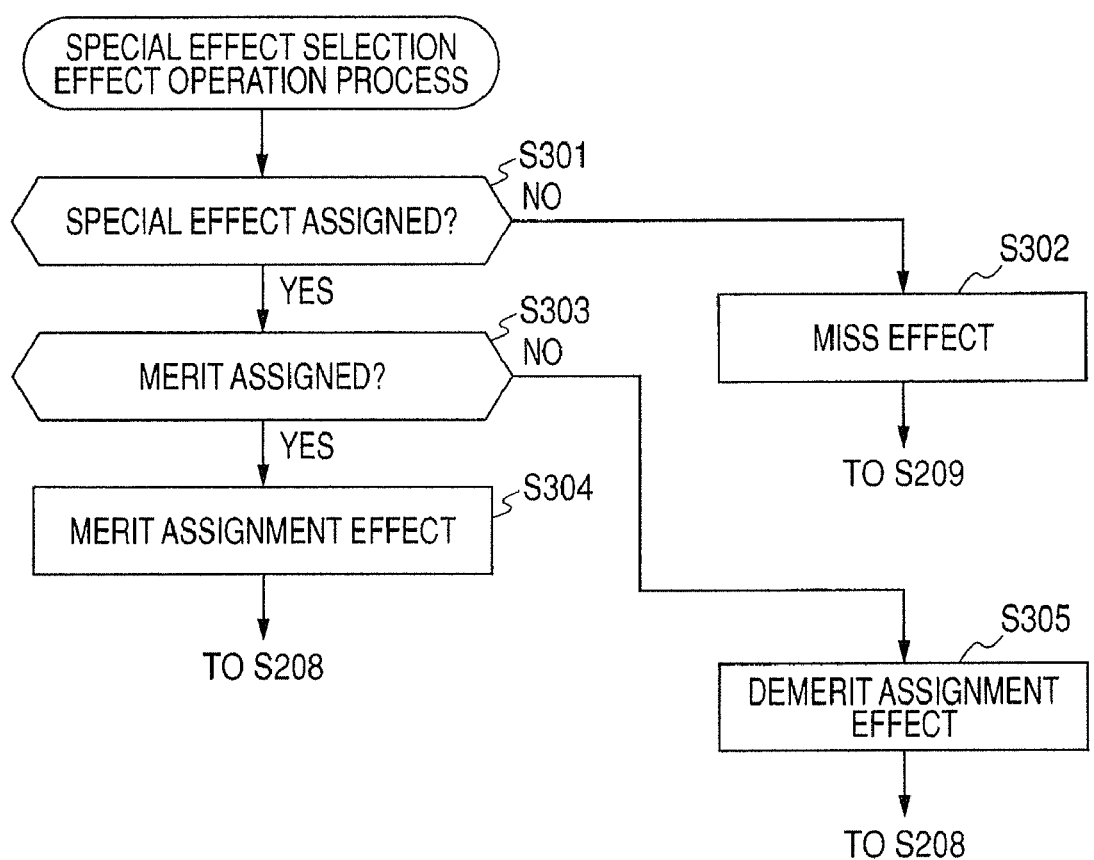
FIG. 6 is a flowchart showing details of a special effect selection presentation operation process.

Next, the controller 11 carries out a special effect selection representation operation (step S207). FIG. 6 is a flowchart showing a specific example of a special effect selection representation operation process in step S207. In the special effect selection representation operation, the controller 11 determines whether to assign a special effect (step S301). The determination may be made using, for example, a random number or the like. If the controller 11 determines not to assign a special effect (for example, it determines to make it a miss) (No in step S301), the controller 11 carries out a miss representation to notify the player that the special effect should not be assigned (step S302). Then, the processing proceeds to step S209.

If the controller 11 determines to assign a special effect (for example, the controller 11 determines to make it a big hit or a hit) (Yes in step S301), it determines whether the special effect to be assigned is provided as a merit or a demerit (step S303). The determination may be made using, for example, a random number or the like. If the controller 11 determines that the special effect is provided as the merit (Yes in step S303), it carries out a merit assignment representation for notifying the player that the merit should be assigned (step S304). Then, the processing proceeds to step S208. Meanwhile, if the controller 11 determines that the special effect is provided as the demerit (No in step S303), it carries out a demerit assignment representation for notifying the player that the demerit should be assigned (step S305). Then, the processing proceeds to step S208.

The "big hit" refers to an alignment of three left, central and right symbols and an assignment of the merit or the demerit in accordance with the aligned symbols. Also, the "hit" refers to an alignment of two of the three left, central and right symbols and an assignment of the merit (for example, a restoration of all the HP and the like) or the demerit (for example, an appearance of a monster or the like) in accordance with the aligned symbols.

The determination in step S301 may be made by the time at least a second one of the three left, central and right symbols is visibly stopped. The determination in step S303 may be made by the time at least all the three left, central and right symbols are visibly stopped.

Figure 5D:
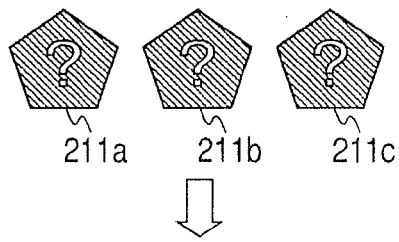

In this regard, a description will be given of examples of the special effect selection representation (the merit assignment representation and the demerit assignment representation) and the miss representation. In the merit assignment representation, the controller 11, as shown in FIG. 5D, changes the fever gauge 207 into three left, central and right big symbol display areas 211a, 211b and 211c, and carries out an effect display representing a slot machine in which, for example, five kinds of symbols change at random. At this point, the notification may be made to inform that the special effect selection representation is ready by causing a whole of the fever gauge 207 to glow. In FIGS. 5D and 5F, a display in each of the symbol display areas 211a to 211c in which symbols are varying sequentially and a stop symbol has not been determined is represented by "?"

Figure 5E:
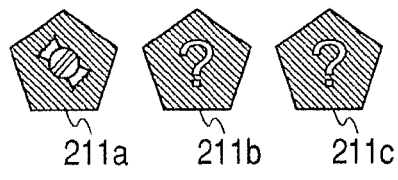
Figure 5F:
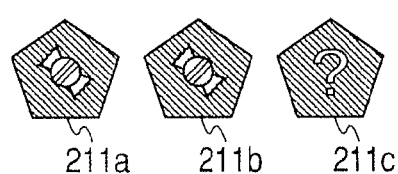
Figure 5G:
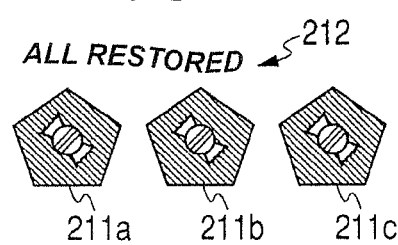

When the merit assignment representation is started, as shown in FIG. 5E, a symbol is visibly stopped in the left symbol display area 211a. Next, as shown in FIG. 5F, a symbol is visibly stopped in the central symbol display area 211b. Then, as shown in FIG. 5G, a symbol is visibly stopped in the right symbol display area 211c.

Any way of determining left, central and right stop symbols is acceptable. However, in case where it is determined to assign a special effect, a control is carried out in such a way that at least two of three symbols are aligned. Also, in case where it is determined not to assign a special effect, a control is carried out in such a way as to execute a "miss representation" such that all three left, central and right symbols differ from one another. Then, in case where it is determined to assign the merit, a control is carried out in such a way as to execute a "merit assignment representation" such that at least two of symbols showing an assignment of the merit are aligned. Furthermore, in case where it is determined to assign the demerit, a control is carried out in such a way as to execute a "demerit assignment representation" such that at least two of symbols showing an assignment of the demerit are aligned. The representation in FIGS. 5D to 5G is an example of the "merit assignment representation".

Although, in this embodiment, it is determined in advance whether the special effect is to be assigned or not, and whether the merit is to be assigned or not, however it may be determined whether the special effect is to be assigned and whether the merit is to be assigned or not based on a result of a symbol display in each of the symbol display areas 211a to 211c.

When the merit assignment representation or the demerit assignment representation is finished, the controller 11 determines a special effect to be assigned to the player character in accordance with a symbol visibly stopped in each of the symbol display areas 211a to 211c, and starts an assignment of the special effect to the player character (step S208)

In the example, in case where a merit assignment representation in which, for example as shown in FIG. 5G, three round drops (displays of wrapped candies) are aligned as stop symbols has been executed, for example, a special effect to restore the HP and MP of the player character is assigned. Then, for example, a message such as "ALL RESTORED" 212 indicating the assigned special representation is displayed above the fever gauge 207. That is, this effect serves as a merit for the player character.

Also, in case where a merit assignment representation in which, for example, three swords (such as, for example, displays of swords) are aligned as stop symbols has been executed, for example, a special effect to cause all attacks by the player character to act as critical hits (for example, attacks which do heavier damage than normal to an enemy character) is assigned. In this case, for example, a message such as "CRITICAL HIT" indicating the assigned special effect is displayed above the fever gauge 207. That is, this special effect serves as a merit for the player character.

Also, in case where a merit assignment representation in which, for example, three sets of armor are aligned as stop symbols, has been executed, a special effect to avoid damage that the player character suffers from the enemy character is assigned. In this case, for example, a message such as "DAMAGE VOIDED" which is the obtained effect is displayed above the fever gauge 207. That is, this special effect serves as a merit for the player character.

Also, in case where a merit assignment representation in which, for example, three Luke bags (for example, bags containing money in the game) are aligned as stop symbols has been executed, a special effect in which the enemy character leaves money in the game when the player character attacks and hits an enemy character is assigned. In this case, for example, a message such as "MONEY" which is the obtained effect is displayed above the fever gauge 207. That is, this special effect serves as a merit for the player character.

Also, in case where a demerit assignment representation in which, for example, three skulls are aligned as stop symbols has been executed, a special effect to rapidly reduce the fever gauge 207 is assigned. In this case, for example, a message such as "FEVER GAUGE REDUCED" which is the obtained effect is displayed above the fever gauge 207. That is, this special effect serves as a demerit for the player character.

Also, in case where a demerit assignment representation in which, for example, three monsters (enemy characters) are aligned as stop symbols has been executed, a special effect in which a monster (an enemy character) appears is assigned. In this case, for example, a message such as "MONSTER APPEARS" which is the obtained effect is displayed above the fever gauge 207. That is, this special effect serves as a demerit for the player character. In case where a demerit assignment effect in which three predetermined monsters (certain enemy characters) are aligned has been executed, the predetermined monster may appear.

Also, in case where, for example, two predetermined stop symbols are aligned, a special effect may be assigned to restore a half of the maximum HP of the player character. In this case, for example, a message such as "HALF HP RESTORED" which is the obtained effect is displayed above the fever gauge 207. That is, this special effect serves as a merit for the player character.

When the miss representation is finished, the controller 11 moves to step S209 without assigning any special effects to the player character. For example, in case where stop symbols differ from one another, the processing proceeds to step S209 without assigning any special effect to the player character. In case where the stop symbols differ from one another, a message such as "MISS" indicating that no special effect is assigned is displayed above the fever gauge 207.

The kind of symbol to be visibly stopped in the special effect selection representation may be stochastically determined at random, or the kind of symbol may be determined to reflect a process of accumulating fever values. For example, the symbols "round drops" which cause the HP of the player character to be restored may be aligned if the player character has damaged an enemy character with a sword and filled up the fever gauge 207. Also, the symbols causing the MP to be restored may be aligned if the player character has damaged an enemy character using magic and filled up the fever gauge 207. Also, although, in the example, the special effect selection representation is carried out using the slot representation representing the slot machine. However, he special effect selection representation may be carried out using another kind of representation such as a roulette representation representing a roulette game. Also, the special effect selection representation may be carried out by the slot representation and the roulette representation simultaneously or consecutively.

Figure 5H:
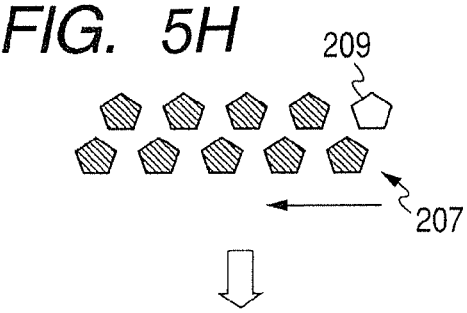
Figure 5I:
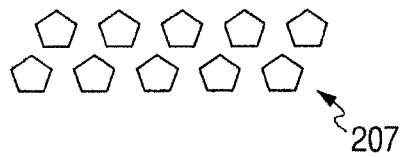

Next, for example, as shown in FIG. 5H, the controller 11 subtracts the fever accumulative value as time elapses (step S209, No in step S210), and decolors each gauge 209 in the fever gauge 207. Then, the fever accumulative value is subtracted until it is reduced to the initial value (for example, 0). When the fever gauge 207 is emptied as shown in FIG. 5I (Yes in step S210), the controller 11 finishes the assignment of the fever state and the special effects (step S211).

As described heretofore, in the embodiment, in case where the predetermined selection allowance conditions are fulfilled (for example, in case where the fever accumulative value, accumulated due to damage which the player character has done to the enemy character or due to damage which the player character has suffered from the enemy character, reaches the predetermined maximum value), the special effect selection representation is executed in which any of predetermined kinds of special effect are selected by a selection, and the player character is provided with the special effect selected in the special effect selection representation. Consequently, it is possible to prevent a special effect to be assigned to the player character when the predetermined selection allowance conditions are fulfilled from being specified in advance by the player, enabling a player's interest in the game to be increased. That is, as it is possible not to automatically determine a special effect, and a special effect to be assigned is contingently determined, it is possible, while the special effect selection representation is being executed, to strongly attract the player's interest until a special effect to be assigned is determined, enabling the player's interest in the game to be increased.

Also, in the embodiment, when the selection allowance conditions are established, it is determined whether or not to assign a special effect to the player character and, when it is determined to assign the special effect, the special effect selection representation is executed. Consequently, it is possible to not always execute the special effect selection representation even when the selection allowance conditions are established, enabling a further increase in the enjoyment of the game.

Also, in the embodiment, when the selection allowance conditions are established, it is determined whether or not to assign a special effect to the player character and, when it is determined not to assign a special effect, the miss representation is executed which notifies that none of the predetermined kinds of special effect is assigned. Consequently, it is possible, when no special effect is assigned, to carry out the miss representation indicating no special effect is to be assigned. That is, it is possible to carry out a representation depending on whether or not a special effect is to be assigned, enabling a further increase in the player's enjoyment of the game. Particularly, by carrying out a miss representation similar to the special effect selection representation as in the embodiment (both are slot representation), it is possible to cause the player to have hopes, enabling a further increase in the player's enjoyment of the game.

Also, in the embodiment, an action value (for example, a fever value) corresponding to a predetermined action (for example, an attack) relating to the player character is accumulated, and the selection allowance conditions are established when the accumulated action value reaches the predetermined value. Consequently, it is possible to cause the player to operate the player character with a sense of purpose in accumulating the action value (concretely, for example, attacks made on an enemy character), enabling a further increase in the player's enjoyment of the game.

Also, in the embodiment, the accumulated action value (for example, the fever accumulative value) is temporally subtracted from a time a special effect is assigned to the player character and, when a fixed period has passed until the accumulated action value is reduced to the initial value, the assignment of the special effect to the player character is finished. Consequently, it is possible, using the scale of the fever gauge 207, to cause the player to recognize a remaining time for which the special effect continues.

Also, in the embodiment, after the predetermined selection allowance conditions are established, a player's actuation of the predetermined button (for example, a request for a special effect assignment) is awaited before executing the special effect selection representation. Consequently, it is possible for the player to specify a time at which to execute the special effect selection representation, enabling a further increase in the player's enjoyment of the game. The special effect selection representation may be executed without waiting for a player's actuation of the predetermined button.

Also, the special effect shown in the embodiment is an example, and other special effects may be assigned such as, for example, an assignment of an item. In case where a non-continuing special effect such as the assignment of the item is assigned, it is preferable that a measurement for a predetermined period by a subtraction of the fever accumulative value, or the like, is not carried out and, as the special effect is assigned, the fever accumulative value is reduced to the initial value, and the scale of the fever gauge becomes emptied.

Also, although, in the embodiment, the video game apparatus main body 10 and the display device 50 are separated, the video game apparatus body 10 may be equipped with the display device 50.

Also, although, in the embodiment, a description is given of a game control of the RPG, it is needless to say that the invention can be applied to a similar kind of game such as a gun action RPG, and moreover, the invention can also be applied to other kinds of games.

Also, although, in the embodiment, a description is given of the video game apparatus 100 as an example, the invention can be applied to various apparatuses, such as a personal computer, a cellular phone terminal and a portable game machine, as long as an apparatus has an image generation function. In case where the invention is applied to the portable game machine or the like, a small-sized storage medium such as a semiconductor memory card may be used as the storage medium 70 in place of the CD-ROM or the DVD-ROM.

Also, although, in the embodiment, game data (various data such as a control program used in the game) for causing the video game apparatus main body 10 to execute the various processes are stored in the storage medium 70, the game data may be distributed by a server apparatus such as a WWW server. In this case, the video game apparatus main body 10 may acquire the game data distributed by the server apparatus via the communication network 80, store them in the HDD 13, load the game data from the HDD 13 into the RAM 12, and use them. Although the game data are used in this embodiment, such data may include at least a control program for causing a computer to execute the image generation process in the embodiment.

The present invention can be applied to a video game apparatus, a personal computer, a cellular phone terminal, a portable game machine or the like that causes an image display apparatus to display a player character on a an image display screen, and controls progress of a video game by controlling an action of the player character displayed on the display screen in accordance with a player's operation.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A video game processing apparatus that causes an image display apparatus to display a player character of a video game on an image screen of the image display apparatus, the video game processing apparatus controlling progress of the video game by controlling an action of the player character displayed on the image screen in accordance with operations by a player, the video game processing apparatus comprising:

a special effect selector that executes a special effect selection for selecting a special effect from among a predetermined plurality of kinds of special effects in a drawing based on an establishment of predetermined selection allowance conditions; and a special effect assignor that assigns, to the player character, the special effect selected by the special effect selector, wherein the predetermined selection allowance conditions include damage given to one of the player character and an enemy character reaching a predetermined value, the player character and the enemy character each include a maximum life value that increases in accordance with the progress of the video game, and the predetermined value increases in accordance with the maximum life value of the one of the player character and the enemy character during the progress of the game.

2. The video game processing apparatus according to claim 1, further comprising:

a special effect assignment determiner that determines whether to assign the special effect to the player character when the predetermined selection allowance conditions are established; and a special effect selection representation executor that displays a special effect selection representation when the special effect assignment determiner determines to assign the special effect.

3. The video game processing apparatus according to claim 2, further comprising:

a special effect non-assignment representation notifier that displays a special effect non-assignment representation for notifying that none of the predetermined plurality of kinds of special effects is assigned, wherein the special effect non-assignment notifier displays the special effect non-assignment representation when the special effect assignment determiner determines not to assign the special effect.

4. The video game processing apparatus according to claim 1, further comprising:

an action value accumulator that accumulates action values as an accumulated action value according to a predetermined action relating to the player character, wherein the selection allowance conditions include the accumulated action value accumulated by the action value accumulator reaching a second predetermined value.

5. The video game processing apparatus according to claim 4, wherein the action value accumulator accumulates the action values in accordance with one of a number of hits from attacks made for the enemy character by the player character and the damage given to the enemy character by the attacks made by the player character.

6. The video game processing apparatus according to claim 4, wherein the action value accumulator accumulates the action values in accordance with one of a number of hits from attacks made on the player character by the enemy character and the damage given to the player character by the attacks made by the enemy character.

7. The video game processing apparatus according to claim 4, further comprising:

an action value subtractor that temporally subtracts the action values from the accumulated action value accumulated by the action value accumulator when the special effect assignor assigns the special effect to the player character, wherein the special effect assigned to the player character remains effective one of for a fixed period of time and until the accumulated action value is reduced to an initial value by the action value subtractor.

8. The video game processing apparatus according to claim 1, further comprising:

a special effect assignment request receiver that receives a request for an assignment of the special effect to the player character after the predetermined selection allowance conditions are established, wherein the special effect selector executes the special effect selection when the special effect assignment request receiver receives the request for the assignment of the special effect.

9. The video game processing apparatus according to claim 1, wherein the special effect selection is executed in accordance with a slot representation.

10. The video game processing apparatus according to claim 1, wherein the special effect selection is executed in accordance with a roulette representation.

11. The video game processing apparatus according to claim 1, wherein the special effect is one of a merit for increasing an action ability of the player character and a demerit for reducing the action ability of the player character.

12. A video game processing method executed by a processor for causing an image display apparatus to display a player character of a video game on an image screen of the image display apparatus, the method controlling progress of the video game by controlling an action of the player character displayed on the image screen in accordance with operations by a player, the video game processing method comprising:

executing, with the processor, a special effect selection for selecting a special effect from among a predetermined plurality of kinds of special effects in a drawing based on an establishment of predetermined selection allowance conditions; and assigning, with the processor and to the player character, the special effect selected by the special effect selection, wherein the predetermined selection allowance conditions include damage given to one of the player character and an enemy character reaching a predetermined value, the player character and the enemy character each include a maximum life value that increases in accordance with the progress of the video game, and the predetermined value increases in accordance with the maximum life value of the one of the player character and the enemy character during the progress of the game.

13. The video game processing method according to claim 12, further comprising:

determining, with the processor, whether to assign the special effect to the player character when the predetermined selection allowance conditions are established; and displaying a special effect selection representation when it is determined to assign the special effect.

14. The video game processing method according to claim 13, further comprising:

displaying, with the processor, a special effect non-assignment representation for notifying that none of the predetermined plurality of kinds of special effects is assigned, wherein the special effect non-assignment representation is displayed when it is determined not to assign the special effect.

15. The video game processing method according to claim 12, further comprising:

accumulating, with the processor, action values as an accumulated action value according to a predetermined action relating to the player character, wherein the selection allowance conditions include the accumulated action value reaching a second predetermined value.

16. The video game processing method according to claim 15, wherein the action values are accumulated in accordance with one of a number of hits from attacks made for the enemy character by the player character and the damage given to the enemy character by the attacks made by the player character.

17. The video game processing method according to claim 15, wherein the action values are accumulated in accordance with one of a number of hits from attacks made on the player character by the enemy character and the damage given to the player character by the attacks made by the enemy character.

18. The video game processing method according claim 15, further comprising:
   subtracting, with the processor, the action values from the accumulated action value when the special effect is assigned to the player character, wherein
   the special effect assigned to the player character remains effective one of for a fixed period of time and until the accumulated action value is reduced to an initial value by subtraction of the action values.

19. The video game processing method according to claim 12, further comprising:
   receiving, by the processor, a request for an assignment of the special effect to the player character after the predetermined selection allowance conditions are established, wherein
   the special effect selection is executed when the request for the assignment of the special effect is received.

20. The video game processing method according to claim 12, wherein the special effect selection is executed in accordance with a slot representation.

21. The video game processing method according to claim 12, wherein the special effect selection is executed in accordance with a roulette representation.

22. The video game processing method according to claim 12, wherein the special effect is one of a merit for increasing an action ability of the player character and a demerit for reducing the action ability of the player character.

23. A non-transitory computer-readable medium including a computer program product for processing a video game, progress of the video game being controlled by causing an image display apparatus to display a player character of a video game on an image screen of the image display apparatus, and controlling an action of the player character displayed on the image screen in accordance with operations by a player, the computer program product causing a computer to execute:
   executing a special effect selection for selecting a special effect from among a predetermined plurality of kinds of special effects in a drawing based on an establishment of predetermined selection allowance conditions; and
   assigning, to the player character, the special effect selected by the special effect selection,
   wherein the predetermined selection allowance conditions include damage given to one of the player character and an enemy character reaching a predetermined value,
   the player character and the enemy character each include a maximum life value that increases in accordance with the progress of the video game, and
   the predetermined value increases in accordance with the maximum life value of the one of the player character and the enemy character during the progress of the game.

24. The non-transitory computer-readable medium according to claim 23, causing the computer to further execute:
   determining whether to assign the special effect to the player character when the predetermined selection allowance conditions are established; and
   displaying a special effect selection representation when it is determined to assign the special effect.

25. The non-transitory computer-readable medium according to claim 24, causing the computer to further execute:
   displaying a special effect non-assignment representation for notifying that none of the predetermined plurality of kinds of special effects is assigned, wherein
   the special effect non-assignment representation is displayed when it is determined not to assign the special effect.

26. The non-transitory computer-readable medium according to claim 23, causing the computer to further execute:
   accumulating action values as an accumulated action value according to a predetermined action relating to the player character, wherein
   the selection allowance conditions include the accumulated action value reaching a second predetermined value.

27. The non-transitory computer-readable medium according to claim 23, wherein the special effect selection is executed in accordance with a slot representation.

28. The non-transitory computer-readable medium according to claim 23, wherein the special effect selection is executed in accordance with a roulette representation.

29. The non-transitory computer-readable medium according to claim 23, wherein the special effect is one of a merit for increasing an action ability of the player character and a demerit for reducing the action ability of the player character.

* * * * *